June 1, 1965 F. A. WESEMANN 3,187,113

SOUND REPRODUCING MEANS

Filed Jan. 5, 1962 2 Sheets-Sheet 1

INVENTOR

Fred A. Wesemann

BY

Stevens, Davis, Miller & Mosher

ATTORNEYS

INVENTOR
Fred A. Wesemann

BY
Stevens, Davis, Miller & Mosher
ATTORNEYS 3,187,113

SOUND REPRODUCING MEANS

Fred A. Wesemann, 12001 Biscayne Blvd., Miami, Fla.

Filed Jan. 5, 1962, Ser. No. 164,565
6 Claims. (Cl. 179—100.2)

The invention disclosed herein relates to improvements in electrical musical instruments, and more particularly to the class wherein tones, which have been pre-recorded on endless magnetized tapes or similar media, are reproduced.

Musical instruments of the above class are well known in the art, and the principal object of the invention disclosed herein is the provision of an instrument of simplified construction, which provides for ready interchangeability of tone tapes whereby the reproduction of almost any combination of tones may be accomplished, and this is done without any sacrifice of quality.

In furtherance of the principal object, another object is the provision of a plurality of tape cartridges which may be readily positioned in, or removed from a cartridge supporting cradle removably positioned within the instrument cabinet or console. Moreover, when tap cartridges are positioned within the cradles, they engage means for driving the tape.

A still further object is a tape cartridge which is a self contained unit, having a reproduction or pickup head, and tape guiding and tension means, which are spaced and positioned relative to one another so that ready mounting of a tape on the cartridge may be accomplished, and when mounted the relative spacing of the guide means may be changed to properly tension the tape.

A still further object is the provision of a tape cartridge and supporting cradle means, which are so constructed that the insertion or removal of the cartridge, within or from the cradle, does not require special skill, the elements being so related that interchangeability of cartridges is substantially as simple as changing a record on a record player.

Another object is the provision of a cradle which may be readily inserted into and removed from the instrument, thus permitting the interchange of cradles, whereby a complete assemblage of a second set of cartridges into a second cradle may be accomplished, while a first set is being used in the instrument.

The above and other objects will become apparent from the description herein, when read in view of the accompanying drawings wherein.

Figures 1, 2:
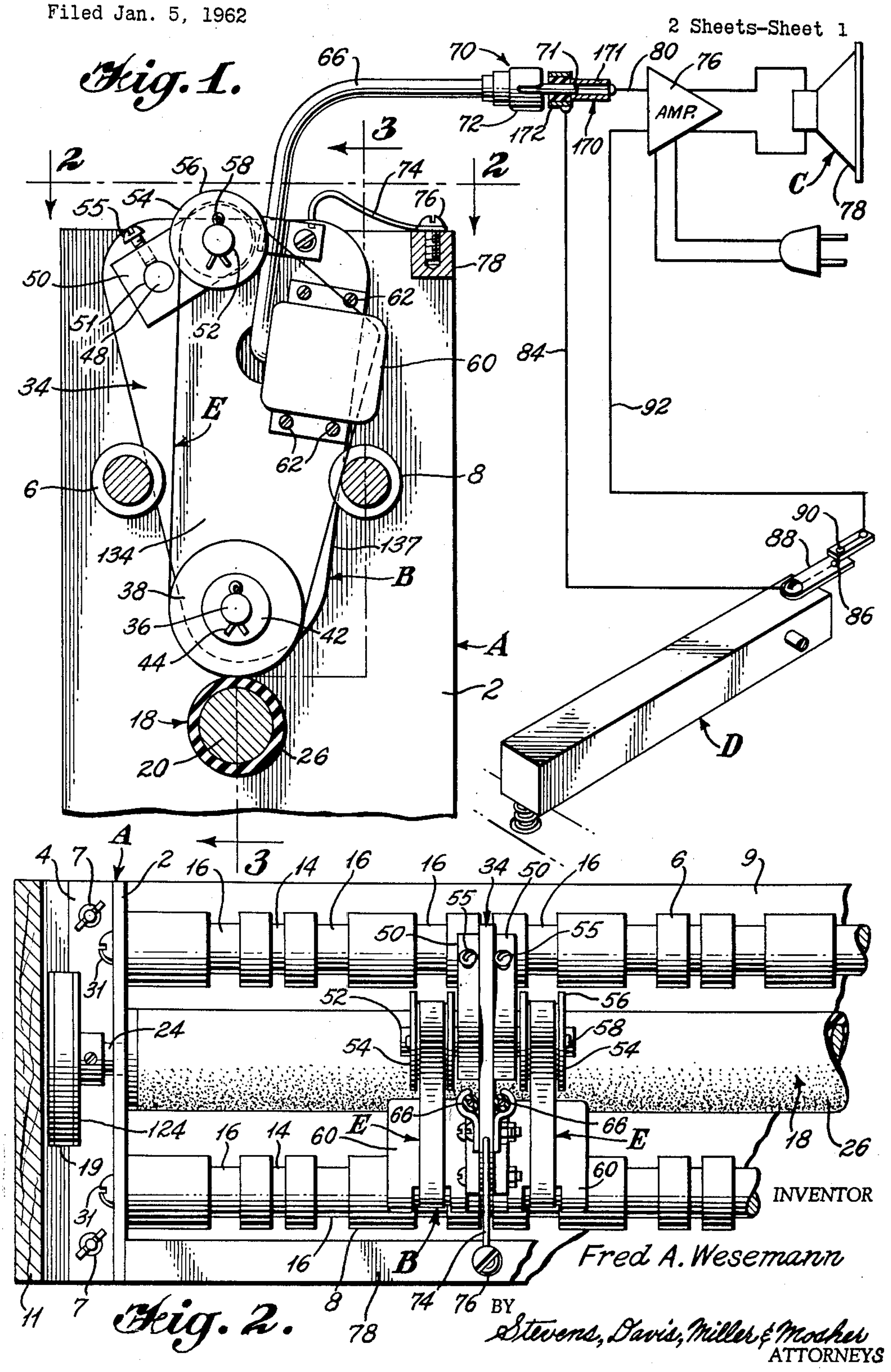
FIGURE 1 is an end view of a unit tape cartridge positioned in cradle supporting means, the cradle being partly in section, and the view diagrammatically including the electronic reproducing means and the key means for opening and closing a circuit control switch.
FIGURE 2 is a plan view taken on line 2—2 of FIGURE 1.

Referring to the drawings, there is shown a carriage or cradle A, in which there is removably supported an endless tape cartridge B, an electronic reproducing means C, and a key actuator D. Each cartridge B is made to carry two endless magnetic tapes E, on which the tone to be reproduced has been recorded. Only a single cradle A and cartridge B are illustrated, as all cartridges and cradles are identical. Likewise a single key D has been shown, it being recognized that the instrument would have the same number of keys as there are endless tapes. The finished instrument would include the usual enclosing cabinet, and a complete key board, however, only those parts necessary for an understanding of the invention are shown and described.

More specifically the cradle A comprises spaced end members 2, each of which has a laterally extending base flange 4 (FIG. 3) for securing the cartridge to a horizontal support 9. The horizontal support 9 extends between, and is secured in any suitable manner to the opposite end members 11 of a cabinet or other enclosing means. The base flanges 4 of the end members 2 are secured to support 9 as by removable butterfly head studs 7, which pass through suitable openings in the flanges 4 and secure into threaded recesses in the support 9.

Extending between the cradle end members 2 are a pair of rigid holding bars or guide shafts 6 and 8, each having their respective ends secured to the end members 2, in any suitable manner, as by the screws 31. The holding bars 6 and 8 are transversely spaced, with their longitudinal axis aligned in the same horizontal plane. Each of the holding bars also has a plurality of opposed longitudinally spaced narrow central grooves 14 cut therein, and to each side of a narrow groove, there is a wider side groove 16, the reason for the grooves being subsequently described.

Figure 3:
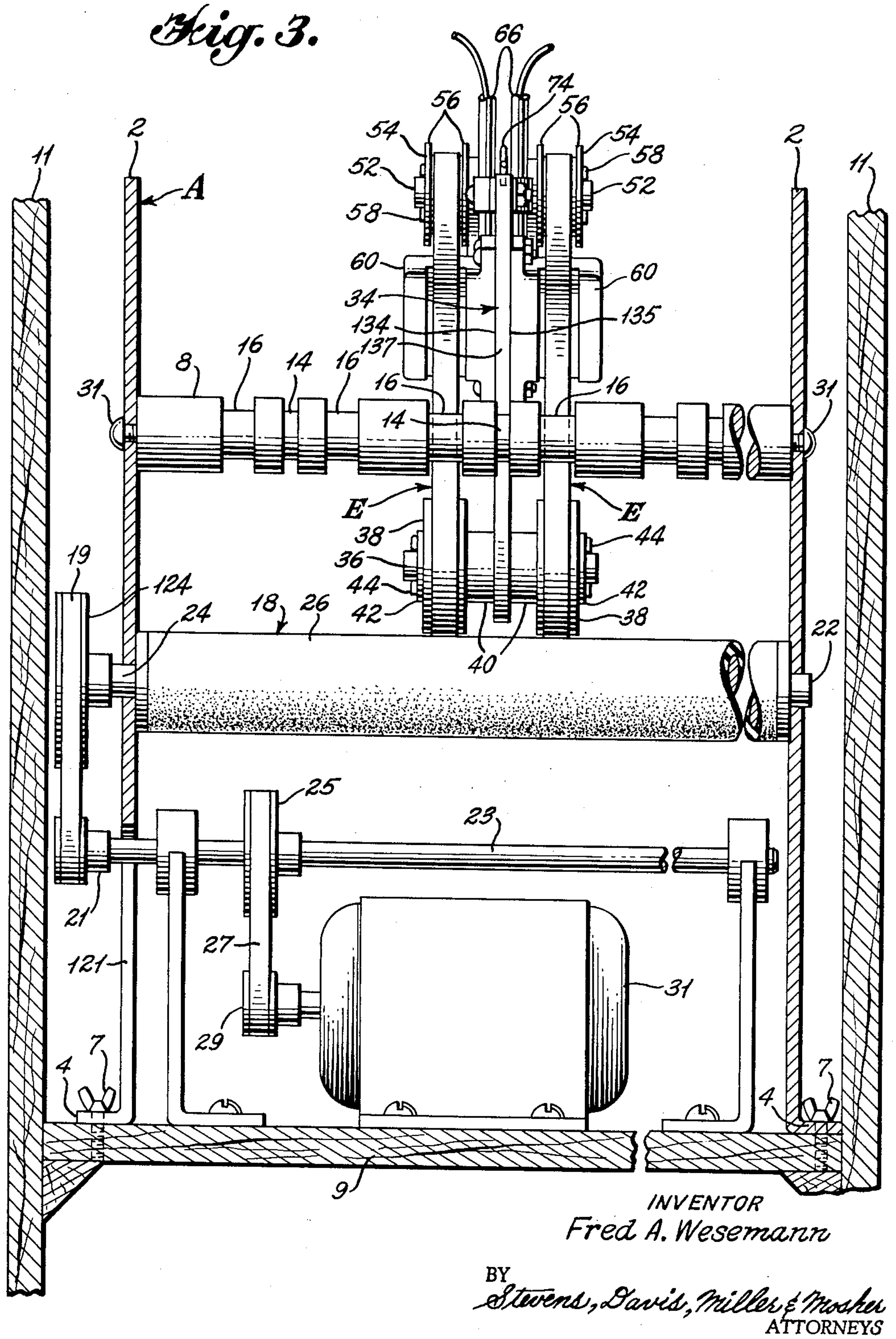
FIGURE 3 is a side view taken on line 3—3 of FIGURE 1 and additionally including the motor means and its connecting means to the cradle.

The cradle end members 2 further support a drive roll 18. The drive roll 18 comprises a rigid shaft member 20, having reduced ends 22 and 24 which are journalled in suitable openings in the end members 2. The shaft member 20 is reduced in diameter for substantially its entire length between the end members 2, this reduction in diameter being sufficient to permit the covering of the shaft with a sleeve 26 (see FIG. 1), of suitable resilient friction drive material, such as rubber. As indicated in FIGURE 3, the reduced end 24 of the drive roll 18 carries a pulley 124 which is connected through a belt 19, to a pulley 21. The pulley 21 is secured to a driving shaft 23, mounted in suitable bearings on the support 9. The driving shaft 23 carries a second pulley 25, which connects through a belt 27 to a pulley 29 mounted on the shaft of a constant speed motor 32. When a plurality of cradles are used, the reduced end 24 of each drive roll 18, will be belt connected to a pulley on driving shaft 23. The drive shaft 23 extends the entire length of the instrument, the cradle end member 2 having a V slot 121 therein to straddle the shaft.

As best seen in FIGURES 1 and 2, the axis of drive roll 18 is positioned in a horizontal plane below that of the supporting bars 6 and 8 and in a vertical plane mid distance between vertical planes extending through the center of each supporting bar. With this arrangement, lines drawn from the center of each supporting bar to the center of the drive roll define a V for reasons hereinafter made clear. The supporting bars 6 and 8, and the drive roll 18 of cradle A constitute the support and driving means for the cartridge B. The bars or shafts 6 and 8 and the drive shaft 18, in combination with the mounting elements 2 constitute an integral or unitary carriage assembly which is removable as a single unit from the cabinet.

The cartridge B includes a plate member 34 of any suitable rigid material, the plate member having oppositely directed vertical faces 134 and 135, and an edge 137, the contour of the plate being an isosceles triangle which defines a V substantially similar to the V defined by the holding bars 6 and 8 and drive roll 18. Thus, when the cartridge B is in the cradle A, the apex of the plate 34 is to the bottom and the base to the top.

The cartridge B carries the endless tapes E, and to accomplish this there is mounted in an opening, adjacent the apex of the plate 34, a shaft 36 of sufficient length to have a portion extend laterally from each face of the plate 34. Supported on each projecting portion is a freely rotatable drive-guide roller 38, preferably made of plastic material. The shaft 36 is so positioned, and the drive roller 38 is of such diameter, that a portion of the roller 38 is positioned beyond and below the edge of plate 34 in order to engage the drive roll 18. The rollers 38 are each positioned equi-distant outwardly from the adjacent face of the plate 34 by spacers 40, and each is held on its shaft portion by a washer 42, and cotter pin 44. Each roller 38 serves as one guide for an endless magnetic tape E.

In order to further guide and tension the tape E, there is secured, in an opening adjacent one base angle of plate 34, a transverse pivot pin 48, which extends laterally from each face of the plate 34, to provide a support for a tensioning arm 50. The tensioning arm 50, has an opening 51, at one end, for pivotally mounting it on the pivot pin 48, and at its other end the arm 50 carries a butt shaft 52, on which there is rotatably mounted a second guide roller 54 which constitutes an idler roller, this roller having peripheral flanges 56 see FIG. 3). Each guide roller 54 is held on its butt shaft 52 by a cotter pin 58. To properly position each guide roller 54 and change its spacing relative to the guide roller 38 on the same face of the plate member, a set screw 55 is mounted in a threaded opening in each tensioning arm 50, to engage, when set up, the pivot 48 and hold the tensioning arm 50 and roller 54, in any adjusted position.

The tape carrier B is completed by mounting on each face of plate 34, a pickup head 60, the pickup heads being secured in position by suitable screws 62. The pickup heads 60 are of any suitable type and are positioned with the gap or slit facing toward and preferably spaced beyond the edge of the plate 34. As best seen in FIGURE 1 each pickup head is positioned intermediate of a guide roller 38 and second base angle of plate 34. Running from each pickup head 60 is a shielded signal cable 66, which terminates in a usual push-pull or plug-jack connector 70. Within the cable 66 are the leads from the pickup head, one of which connects to the center pin 71 and the other to collar 72 of the push pull connector.

With the cartridge B so constructed, the guide roll 54 is spaced from guide roll 38. The pickup head 60 is spaced to one side of a line connecting the centers of the guide rolls, whereby tape E travels in a triangular path. The tape E may readily be entrained on, or removed from, the cartridge B by releasing the tensioning arm set screw 55 then rotating arm 50 clockwise on pivot pin 48, whereupon the tape may be readilly slipped over both guides and across the pickup head. The tensioning arm may then be raised until the tape is properly tensioned, whereupon it is secured by set screw 54. It will be noted that once the tape is pretensioned and the tensioning arm secured in fixed position, the tape remains properly tensioned, and it is not subject to the fluctuations which occur with tensioning devices which ride on the tape and depend upon gravity, or spring means, for maintaining engagement with the tape.

It is apparent from the foregoing that the cartridge B is a complete self contained two tape unit which may be called a magazine-type cartridge since it is readily removable and insertable as a unitary cartridge assembly. Thus for a standard eighty-eight note key board, forty-four cartridges would be required, or put another way, one tape carrier is required for each pair of keys on the instrument.

As best seen in FIGURES 1 and 2, when the cartridge B is supported in the cradle A, the plate member 34 fits into the grooves 14 of the supporting rods 6 and 8, and the tape guide roller 38 makes surface engagement with the cradle drive roller 18. The guide roller 38 thus serves as a drive roll for the tape, and although the tape E passes around the guide wheel 38, the surface of roll 18 is sufficiently resilient to also engage wheel 38 to either side of the tape, thus assuring positive driving of the tape.

Inasmuch as the cartridge B is not permanently fixed in position, the width of plate 34 is such that its faces frictionally engage the side walls and the bottom of the groove 14, thus preventing any wobbling of the tape carrier, although permitting its ready insertion and removal. As is seen in FIGURE 1, the face of the plate comprise unobstructed face portions which permit the plate 34 to be slidingly inserted into the grooves 14, these unobstructed face portions being frictionally engaged by the side walls of the grooves 14 as already explained in the preceding sentence. The supporting bars 6 and 8 are of round stock, this being used for convenience in manufacture, it being evident that any type of bar could be used which is properly grooved to receive the plate member 34. As the supporting rods 6 and 8 are made of round stock, the grooves 16, to each side of grooves 14, are cut to assure ample clearance for the tape E. The construction of the cradle A and cartridge B are such that no special skill is required in assembling them, nor is any adjustment of parts required.

In the embodiment shown the plate member 34 is metal with sufficient weight to provide a downward gravity force. The plate member could have the center portion removed to define a triangular frame, and could be made of plastic. If this be done, additional to the weight of the tape carrier A, a spring finger 74 may be used to provide a downward acting force. As seen in FIGURE 1, the spring finger may have one end looped around a screw 76 which is threadedly mounted into a bar 78 extending between the cradle end member 2. The screw, when fully set up, does not bind the spring finger but allows rotation whereby the free end may be moved into or out of engagement with the top edge of plate 34.

As diagrammatically illustrated in FIGURE 1 the pickup heads 60 are connected into the reproducing means C which include a suitable amplifier 76 connected by conductors to a loud speaker 78. The center pole 71 of each pickup head push-pull connector telescopes into a throat 171 of a complementary connector or socket 170. The collar 72 of connector 70 telescopes over the collar 172 of conector 170. The throat 171 connects through a conductor 80 to the amplifier, and each collar 172 connects through a conductor 84 to a contact 86 carried by a bar of insulating material 88 on the back end of the key D. The contact 86 engages a second contact 90, also carried by the bar of insulating material, secured to the instrument in any suitable way, upon depressing the key member D, the contact 86 will engage contact 90 which connects through a conductor 92 to the amplifier 76, thus completing the circuit.

From the foregoing it will be seen that when constant speed motor 30 is started, it will drive shaft 23 and cradle drive roll 18, whereupon the tapes E will be continuously operated. Thereafter, upon depressing the key D, the pickup head 60 electrically connected thereto, will be placed in closed circuit and the tone on the selected tape reproduced.

The above description of the device fully establishes its advantages. The simplified cradle A, may inexpensively be manufactured and readily assembled as a unit, and the unit may thereafter be readily positioned in or removed from a cabinet. The simplified construction of the cartridge B, its ready insertion and removal from the cradle A, and the ready mounting and removability of tapes therefrom, result in great simplicity and interchangeability. As each cartridge B is a complete unit, it is, in effect, equivalent to a record, and albums of cartridges may be assembled to allow rapid interchange, without changing tapes from one cartridge to another.

Because the cradle A may be readily removed from the cabinet, a duplicate cradle complete with cartridges B, may be assembled to replace the cradles being used in the instrument, a great advantage when time is of the essence, as in the entertainment field. Likewise, instead of having a single cradle for the instrument, a plurality of cradles, may be used, thus greatly increasing the combinations of different tones which may be produced.

It will be understood that various changes could be made without departing from the invention herein as defined by the following claims.

What is claimed is:

1. A musical instrument of the type described, comprising a cabinet and a carriage mounted in said cabinet, said carriage comprising two horizontal guide shafts and a horizontal drive shaft, said shafts all being parallel to each other, said guide shafts being spaced from each other in a common horizontal plane, said drive shaft being rotatably mounted about a horizontal axis which lies in a vertical plane located between the axes of said guide shafts and in a horizontal plane spaced below that of said drive shafts, said guide shafts being identical to each other and each comprising a set of circumferential grooves, said set of grooves comprising a central groove and a side groove on each axial side of said central groove, corresponding grooves in each of said guide shafts being aligned opposite each other in common vertical planes, a tape cartridge removably mounted in said carriage, said cartridge comprising a flat mounting plate having vertical faces bounded by downwardly converging opposite side edges, said plate being downwardly wedged between said two guide shafts with opposite ones of said edges respectively lying in opposite ones of said central grooves, said plate comprising an upper and lower roller means, said upper and lower means respectively comprising an idler and a drive roller rotatably mounted on each vertical face of said plate for rotation about respective axes which are parallel to the axis of said drive shaft, said drive rollers having a circumferential periphery which extends radially beyond the lower peripheral edge of said plate, said periphery of said rollers being in contact with said drive shaft whereby rotation of said drive shaft rotates said drive rollers through frictional contact therewith, said cartridge also comprising a pickup head on each said vertical face of said plate and positioned intermediate of said idler and drive rollers and to one side of a straight line connecting the axes of said idler and drive rollers, a signal cable leading from each of said heads, a sound amplifier circuit, each of said cables comprising a plug-jack removably plugged into said circuit, a keyboard comprising one key for each aligned pair of said side grooves, each key being actuable to complete the amplifier circuit to a corresponding one of said pickup heads, a motor drivingly connected to said drive shaft, a sound tape on each said vertical side of said plate, said tape being entrained about said drive and idler rollers and through said pickup head, said tape being guided by passing through a pair of said opposite side grooves which are in a common vertical plane.

2. The instrument of claim 1, comprising mounting elements, said guide shafts and drive shaft being mounted on and between said elements with said drive shaft being rotatably mounted and said guide shafts being fixedly mounted, said elements and shafts constituting a unitary carriage assembly which is adapted to be removed from said cabinet as a single unit, means on said elements detachably mounting said carriage assembly to said cabinet.

3. The instrument of claim 2, comprising a plurality of said carriage assemblies, each said assembly being independently removably mounted in said cabinet, said keyboard comprising a number of keys equal to the total number of aligned pairs of said side slots in all of said carriage assemblies.

4. The instrument of claim 1, wherein said guide shafts each comprises a plurality of said sets of grooves along its axial extent, a separate one of said plates and its corresponding pair of said tapes being accommodated in each set of grooves, the drive rollers on all of said plates simultaneously being in driving contact with said drive shaft.

5. The instrument of claim 4 wherein said drive shaft comprises a frictional surface material and said drive shaft rotates each of said drive rollers by frictionally engaging the respective peripheral surface of each of said drive rollers.

6. The instrument of claim 1, wherein said cartridge is disengageable from said guide shafts and removable therefrom through said cartridge being manually grasped and being pulled upwardly, said cartridge being supported and held between said guide shafts by no other than by said plate being wedged between said guide shafts as aforementioned.

References Cited by the Examiner

UNITED STATES PATENTS

| | | | |
|---|---|---|---|
| 2,598,132 | 5/52 | Pattyn | 179—100.2 |
| 2,821,576 | 1/58 | Gaubert | 179—100.2 |

IRVING L. SRAGOW, *Primary Examiner.*

BERNARD KONICK, *Examiner.*